(12) United States Patent
Hu et al.

(10) Patent No.: US 8,020,336 B2
(45) Date of Patent: Sep. 20, 2011

(54) TRAWL NET LAYER-BY-LAYER COLLECTING DEVICE

(75) Inventors: Fuxiang Hu, Tokyo-To (JP); Tadashi Tokai, Yokohama (JP); Yoshioki Ozeki, Yokohama (JP); Hiroshi Kubota, Yokohama (JP); Chiaki Tomatsu, Yokohama (JP); Tetsuro Ino, Koganei (JP)

(73) Assignee: National University Corporation Tokyo University of Marine Science and Technology, Tokyo (JP)

( * ) Notice: Subject to any disclaimer, the term of this patent is extended or adjusted under 35 U.S.C. 154(b) by 179 days.

(21) Appl. No.: 12/310,493

(22) PCT Filed: Mar. 30, 2007

(86) PCT No.: PCT/JP2007/057137
§ 371 (c)(1),
(2), (4) Date: Feb. 26, 2009

(87) PCT Pub. No.: WO2008/026339
PCT Pub. Date: Mar. 6, 2008

(65) Prior Publication Data
US 2009/0282723 A1  Nov. 19, 2009

(30) Foreign Application Priority Data
Aug. 31, 2006  (JP) .................................. 2006-235932

(51) Int. Cl.
*A01K 73/02*  (2006.01)
*A01K 73/04*  (2006.01)

(52) U.S. Cl. ..................................... 43/9.1; 43/9.7; 43/8

(58) Field of Classification Search .................. 43/8, 9.1, 43/9.2, 9.3, 9.7, 7
See application file for complete search history.

(56) References Cited

U.S. PATENT DOCUMENTS
1,133,927 A  *  3/1915  Buzard ........................... 56/337
(Continued)

FOREIGN PATENT DOCUMENTS
JP  52-22096  2/1977
(Continued)

OTHER PUBLICATIONS
International Search Report mailed Jun. 26, 2007 for International Application No. PCT/JP2007/057137.
(Continued)

*Primary Examiner* — Darren W Ark
(74) *Attorney, Agent, or Firm* — Wenderoth, Lind & Ponack, L.L.P.

(57) ABSTRACT

A trawl net layer-by-layer collecting device includes a rectangular cylindrical frame configured to draw a plurality of trawl nets that are arranged in an up and down direction. The frame includes an upper edge to which a net mouth edge of an upper net of the uppermost trawl net is anchored, and a lower edge to which a net mouth of a lower net of the lowermost trawl net is anchored. A pair of vertical bars are disposed on opposed sides of the frame. A slider having opposed ends slidably engaged with the vertical bars, the slider anchoring thereto the net mouth edge of the lower net of the upper trawl net and the net mouth edge of the upper net of the lower trawl net. A net-mouth opening and closing unit is configured to lock the sliders on upper ends of the vertical bars, and unlock the locked sliders one by one; and a controller.

10 Claims, 9 Drawing Sheets

U.S. PATENT DOCUMENTS

| | | | |
|---|---|---|---|
| 1,214,450 A * | 1/1917 | Gifford | 56/337 |
| 2,653,403 A * | 9/1953 | Oslund | 43/11 |
| 2,721,411 A * | 10/1955 | Pedersen | 43/9.1 |
| 2,765,565 A * | 10/1956 | Mussio | 43/9.1 |
| 2,879,737 A * | 3/1959 | Gorton | 43/9.1 |
| 3,440,752 A * | 4/1969 | Minter | 43/9.2 |
| 3,461,591 A * | 8/1969 | Brown et al. | 43/9.1 |
| 4,224,755 A * | 9/1980 | Bourret | 43/9.1 |
| 4,272,906 A * | 6/1981 | Liebling | 43/11 |
| 4,509,286 A * | 4/1985 | John | 43/9.1 |
| 4,514,924 A * | 5/1985 | Ojserkis | 43/9.1 |
| 4,697,372 A * | 10/1987 | Leonard | 43/9.1 |
| 4,783,927 A * | 11/1988 | Leonard | 43/9.1 |
| 5,058,307 A * | 10/1991 | Garrett | 43/9.1 |
| 5,276,995 A * | 1/1994 | Johnson | 43/7 |
| 5,325,619 A * | 7/1994 | Paul | 43/9.2 |
| 5,347,860 A * | 9/1994 | Rimer | 43/9.1 |
| 5,501,026 A * | 3/1996 | Bryant et al. | 43/12 |
| 5,509,227 A * | 4/1996 | Marrero | 43/7 |
| 5,822,908 A * | 10/1998 | Blanchard | 43/7 |
| 6,065,239 A * | 5/2000 | Thomas et al. | 43/8 |
| 6,138,397 A * | 10/2000 | Hammersland et al. | 43/9.1 |
| 7,405,999 B2 * | 7/2008 | Skjold-Larsen | 43/9.7 |
| 2009/0241404 A1 * | 10/2009 | Hu et al. | 43/9.7 |

FOREIGN PATENT DOCUMENTS

| | | | |
|---|---|---|---|
| JP | 3-15016 | | 4/1991 |
| JP | 03198731 A | * | 8/1991 |
| JP | 08094754 A | * | 4/1996 |
| JP | 2008263919 A | * | 11/2008 |

OTHER PUBLICATIONS

International Preliminary Report on Patentability and Written Opinion of the International Searching Authority mailed Mar. 12, 2009 for International Application No. PCT/JP2007/057137.

* cited by examiner

TRAWL NET LAYER-BY-LAYER COLLECTING DEVICE

BACKGROUND OF THE INVENTION

I. Field of the Invention

The present invention relates to a trawl net layer-by-layer collecting device, which can collect nektonic animals in the sea according to water depth, by towing a plurality of trawl nets, and by opening and closing net mouths depending on the water depth so as to switch the trawl nets for collecting animals.

In particular, the present invention relates to a trawl net layer-by-layer collecting device, which has a lightweight structure.

In addition, the present invention relates to a trawl net layer-by-layer collecting device of an autonomously openable and closable type, which can autonomously open and close the trawl nets depending on the water depth and the net-towing time period, without being remotely controlled from the ship.

II. Description of the Related Art

With a view to sustainable effective utilization of marine organism resources, the TAC (Total Allowable Catch) system and the TAE (Total Allowable Effort) system, which are intended for major fishes to be fished, have been adopted.

In order to improve a management effect of resources by these systems, it is necessary to exactly assess the resource amount for each kind of fishes. As one of the means therefor, larval and juvenile fishes are collected according to water depth.

In order to collect larval and juvenile fishes in each layer, there have been conventionally proposed a trawl net layer-by-layer collecting device referred to as "MOCNESS" (MOCNESS-type trawl net layer-by-layer collecting device), a trawl net layer-by-layer collecting device referred to as "RMT" (RMT-type trawl net layer-by-layer collecting device), and a trawl net layer-by-layer collecting device referred to as "LOCHNESS" (LOCHNESS-type trawl net layer-by-layer collecting device).

FIG. 8 generally shows a conventional LOCHNESS-type trawl net layer-by-layer collecting device. FIG. 9 shows a longitudinal section thereof.

As shown in FIG. 8, the conventional LOCHNESS-type trawl net layer-by-layer collecting device includes a rectangular cylindrical frame 22 for towing a plurality of trawl nets 21a, 21b, 21c, 21d.

The frame 22 includes therein plural pairs of vertical bars 23.

A horizontal slider 24 is extended between each of the pairs of vertical bars 23, the slider 24 having opposed ends thereof that are slidably engaged with the vertical bars 23.

As apparently shown in FIG. 9, a net-mouth edge of a lower net of the first trawl net 21a is anchored to the slider 24 between the first pair of vertical bars 23, and a net-mouth edge of an upper net of the first trawl net 21a is anchored to another slider 24 between the second pair of vertical bars 23.

Anchored to the slider 24 between the second pair of vertical bars 23 are the net-mouth edge of the upper net of the first trawl net 21a, and a net-mouth edge of a lower net of the second trawl net 21b.

Similarly, anchored to the slider 24 between the third pair of vertical bars 23 are a net-mouth edge of an upper net of the second trawl net 21b, and a net-mouth edge of a lower net of the third trawl net 21c. This is similar to the fourth and fifth sliders 24. A net-mouth edge of an upper net of the trawl net and a net-mouth edge of a lower net of the trawl net adjacent thereto are anchored to the same slider.

The LOCHNESS-type trawl net layer-by-layer collecting device 20 has, on an upper part thereof, locking devices 25 for locking the respective sliders 24.

Outside the frame 22, floats 26 are disposed on opposed sides of the frame 22, so that a buoyancy of the LOCHNESS-type trawl net layer-by-layer collecting device 20 can be adjusted.

Horizontal fin stabilizers 27 are disposed rearward the frame 22, so that a stance of the LOCHNESS-type trawl net layer-by-layer collecting device 20 can be stabilized.

Net-towing wires 28 are connected to the upper parts of the LOCHNESS-type trawl net layer-by-layer collecting device 20.

As shown in FIG. 9, in the LOCHNESS-type trawl net layer-by-layer collecting device 20, the first slider 24 is lowered at first. Under this state, the first trawl net 21a is opened, while the other trawl nets 21b, 21c, and 21d are closed.

Then, the second slider 24 is unlocked by the locking device 25 so as to be lowered by its own weight. Thus, the first trawl net 21a is closed and the second trawl net 21b is opened.

Similarly, when the third slider 24 is unlocked by the locking device 25 so as to be lowered by its own weight, the third trawl net 21c is opened. When the fourth slider 24 is unlocked by the locking device 25 so as to be lowered by its own weight, the fourth trawl net 21d is opened.

The locking devices 25 are remotely operated from the ship. In order to control the locking devices 25 from the ship, it is necessary that the ship and the LOCHNESS-type trawl net layer-by-layer collecting device 20 are connected to each other by a conducting wire, or that a transmitter and a receiver of ultrasonic hydrophone are provided.

However, since weights of the conventional "MOCNESS-type trawl net layer-by-layer collecting device", the "RMT-type trawl net layer-by-layer collecting device" and the "LOCHNESS-type trawl net layer-by-layer collecting device" are heavy, a special winch for controlling a conducting wire or a remote controller formed of an ultrasonic hydrophone are required, but the number of ships capable using these equipments is limited.

Therefore, an object of the present invention is to provide a lightweight trawl net layer-by-layer collecting device, which can collect nektonic animals in the sea according to water depth.

In addition, the conventional "MOCNESS-type trawl net layer-by-layer collecting device", the "RMT-type trawl net layer-by-layer collecting device", and the "LOCHNESS-type trawl net layer-by-layer collecting device" have to be controlled from the ship in order to switch the opening and closing of the trawl nets.

When the trawl nets are controlled through a wire from the ship, a special winch and a conducting wire of a cable (armored cable) are needed. When the trawl nets are wirelessly controlled, a transmitter and a receiver formed of an ultrasonic hydrophone are needed. Namely, the ship has to be provided with some equipments for the remote control.

Thus, another object of the present invention is to provide a trawl net layer-by-layer collecting device, which can autonomously open and close the trawl nets, by detecting the water depth and the net-towing time period, under conditions suitable for collecting animals, without any special equipment for controlling the opening and closing of the trawl nets.

In the conventional "MOCNESS-type trawl net layer-by-layer collecting device", the "RMT-type trawl net layer-by-layer collecting device", and the "LOCHNESS-type trawl net layer-by-layer collecting device", each of the net mouths is opened and closed by means of the weight of the slider. Thus, in order that the slider can smoothly slide down, the weight of the slider has to be increased. Such an increase in weight of the slider increases the weight of the overall device.

Thus, a further object of the present invention is to provide a trawl net layer-by-layer collecting device, which is lightweight but is capable of switching the opening and closing of the net mouths by means of the weight of the slider.

SUMMARY OF THE INVENTION

A trawl net layer-by-layer collecting device according to the present invention comprises: a rectangular cylindrical frame configured to draw a plurality of trawl nets that are arranged in an up and down direction, the frame including an upper edge to which a net mouth edge of an upper net of the uppermost trawl net is anchored, and a lower edge to which a net mouth of a lower net of the lowermost trawl net is anchored; a pair of vertical bars disposed on opposed sides of the frame; at least one substantially horizontal slider whose opposed ends are slidably engaged with the vertical bars, the slider anchoring thereto the net mouth edge of the lower net of the upper trawl net and the net mouth edge of the upper net of the lower trawl net; a net-mouth opening and closing unit configured to lock the sliders on upper ends of the vertical bars, and unlock the locked sliders one by one so that the unlocked slider slides down along the vertical bars so as to switch opening and closing of the net mouths of the trawl nets; and a controller configured to control an activation of the net-mouth opening and closing unit; wherein: the controller includes a timer, and a storage medium storing a predetermined net-towing time period as a timing for activating the net-mouth opening and closing unit; and the controller inputs a net-towing time obtained from the timer, and activates the net-mouth opening and closing unit upon arrival of the predetermined net-towing time period stored in the storage medium, so as to switch the opening and closing of the net mouths of the trawl nets.

The trawl net layer-by-layer collecting device according to the present invention further comprises a bathometer, wherein: the storage medium stores a predetermined water depth in an increase inclination or a decrease inclination of water depth, as a timing for activating the net-mouth opening and closing unit; and the controller inputs water depths obtained from the bathometer, judges whether the water depth is increased or decreased based on a difference between the water depths of different timings, and activates the net-mouth opening and closing unit when the increase inclination or the decrease inclination of water depth and the current water depth satisfy the increase inclination or the decrease inclination of water depth and the predetermined water depth which are stored in the storage medium, so as to switch the opening and closing of the net mouths of the trawl nets.

The storage medium may store a combination of a predetermined net-towing time period and a predetermined water depth, as a timing for activating the net-mouth opening and closing unit; and the controller may input a net-towing time period obtained from the timer and a water depth obtained from the bathometer, and activate the net-mouth opening and closing unit when the net-towing time period and the current water depth satisfy the combination of the predetermined net-towing time period and the predetermined water depth which are stored in the storage medium, so as to switch the opening and closing of the net mouths of the trawl nets.

The trawl net layer-by-layer collecting device according to the present invention may comprise: a closure sensor configured to detect the fact that the slider slides down or up to a predetermined position; and a recording unit configured to record data in the storage medium; wherein the controller inputs a time at which the controller activates the net-mouth opening and closing unit, a water depth thereat, a time at which the closure sensor detects the fact that the slider slides down up to the predetermined position, and a water depth thereat, which are obtained from the timer and the bathometer, and causes the recording unit to record in the storage medium the time at which the net-mouth opening and closing unit is activated, the water depth thereat, the time at which the slider slides down up to the predetermined position, and the water depth thereat.

The slider may be provided at opposed ends thereof with engagement rings that are slidably engaged with the vertical bars, and at least a part of each of the engagement rings in contact with the vertical bar may be made of a low frictional resin.

The trawl net layer-by-layer collecting device according to the present invention comprises: a rectangular cylindrical frame configured to draw a plurality of trawl nets that are arranged in an up and down direction, the frame including an upper edge to which a net mouth edge of an upper net of the uppermost trawl net is anchored, and a lower edge to which a net mouth edge of a lower net of the lowermost trawl net is anchored; a pair of vertical bars disposed on opposed sides of the frame; at least one substantially horizontal slider whose opposed ends are slidably engaged with the vertical bars, the slider anchoring the net mouth edge of the lower net of the upper trawl net and the net mouth edge of the upper net of the lower trawl net; a pair of side-net anchoring bars to which the net mouth edges of side nets of the trawl nets are slidably engaged, an upper end of each of the side-net sliding bars being positioned near the vertical bar, and a lower end thereof being inclined away from the vertical bar in a direction reverse to a net-towing direction; a net-mouth opening and closing unit configured to lock the sliders on upper ends of the vertical bars, and unlock the locked sliders one by one so that the unlocked slider slides down along the vertical bars so as to switch the opening and closing of the net mouths of the trawl nets; and a controller configured to control an activation of the net-mouth opening and closing unit.

Each of the side-net anchoring bars may be inclined forward at an angle between 3° and 8° relative to the vertical bar in the net-towing direction.

Net-towing wires may be connected to center portion of the frame in a high direction thereof.

The slider may be provided at opposed ends thereof with engagement rings that are slidably engaged with the vertical bars. At least a part of the engagement ring in contact with the vertical bar may be made of a low frictional resin.

In the conventional LOCHNESS-type trawl net layer-by-layer collecting device, there are disposed plural pairs of vertical bars for opening and closing net mouths of a plurality of trawl nets, and these bars are arranged in the frame in the net-towing direction in a fore and aft direction. On the other hand, in the present invention, there is disposed only one pair of vertical bars, and at least one slider for anchoring the net mouth edge of the trawl net is slidably engaged with the vertical bars.

When the plural pairs of vertical bars are arranged in the frame in the net-towing direction in the fore and aft direction, as in the LOCHNESS-type trawl net layer-by-layer collecting device, the length of the frame is elongated in the net-towing direction, the number of components is increased, and the frame is enlarged, which results in increase in weight of the device.

On the other hand, since the present invention includes only one pair of vertical bars, the length of the frame can be reduced in the net-towing direction, the number of components can be decreased, and the frame can be made smaller. Thus, the lightweight trawl net layer-by-layer collecting device can be achieved.

In addition, the present invention includes the net-mouth opening and closing unit configured to lock the sliders on the upper ends of the vertical bars, and unlock the locked sliders one by one so that the unlocked slider slides down along the vertical bars so as to switch the opening and closing of the net mouths of the trawl nets.

In addition, the present invention includes the controller configured to control an activation of the net-mouth opening and closing unit. The controller is provided with a timer and a storage medium storing a timing for activating the net-mouth opening and closing unit. The controller compares the net-towing time obtained from the timer with the activation timing stored in the storage medium, and activates the net-mouth opening and closing unit at a suitable timing.

The net-mouth opening and closing unit unlocks one of the locked sliders based on a control signal from the controller. Thus, the slider slides down by its own weight along the vertical bars, so that the trawl nets are switched to be opened and closed.

In the present invention, the net-mouth opening and closing unit unlocks the locked slider. The unlocked slider slides down by its own weight so that the trawl nets are switched to be opened and closed. Thus, a special driving equipment for forcibly switching the trawl nets to be opened and closed is unnecessary.

In addition, the controller that activates the net-mouth opening and closing unit is controlled by the timer provided in the controller and the activation timing stored in the storage medium. Thus, it is not necessary to remotely operate the controller from the ship, and the net mouths of the trawl nets can be autonomously switched to be opened and closed. Thus, a special equipment required for forcibly switching the trawl nets to be opened and closed can be omitted.

The present invention may include a closure sensor configured to detect the fact that the slider slides down up to a predetermined position, and a recording unit configured to record data in the storage medium.

In this case, the recording unit can record in the storage medium a time at which the net-mouth opening and closing unit is activated, and a time at which the slider slides down up to the predetermined position. Thus, after the trawl net layer-by-layer collecting device has been drawn up, it can be confirmed whether the trawl nets are switched to be opened and closed in an intended manner, by reading the data recorded in the storage medium.

In addition, the present invention may include a bathometer, and the storage medium can store a timing for activating the net-mouth opening and closing unit, the timing being determined by a combination of a predetermined net-towing time period and a predetermined water depth.

In this case, the net-mouth opening and closing unit can be activated at an intended water depth and at an intended net-towing time period.

In addition, the present invention may include a bathometer, and the storage medium can store a timing for activating the net-mouth opening and closing unit, the timing being determined by a predetermined water depth in an increase inclination or a decrease inclination of water depth.

In this case, an inertia of a downward movement or an upward movement can be estimated, whereby animals in the sea can be collected at an intended water depth, after the device has been stabilized at the intended water depth.

Another invention of this patent application comprises: a rectangular cylindrical frame configured to draw a plurality of trawl nets that are arranged in an up and down direction; a pair of vertical bars disposed on opposed sides of the frame; at least one substantially horizontal slider whose opposed ends are slidably engaged with the vertical bars; and a pair of side-net anchoring bars whose upper ends are inclined in a net-towing direction.

Anchored to an upper edge of the frame is a net mouth edge of an upper net of the uppermost trawl net. Anchored to a lower edge of the frame is a net mouth edge of a lower net of the lowermost trawl net.

Anchored to the slider are the net mouth edge of the lower net of the upper trawl net and the net mouth edge of the upper net of the lower trawl net.

Anchored to the side-net anchoring bars are net mouth edges of side nets of all the trawl nets.

There is provided a net-mouth opening and closing unit configured to lock the sliders on upper ends of the vertical bars, and unlock the locked sliders one by one so that the unlocked slider slides down along the vertical bars so as to switch opening and closing of the net mouths of the trawl nets.

According to the present invention, the side-net anchoring bars are inclined forward in the net-towing direction, and the side nets of the trawl nets are anchored to the side-net anchoring bars. Thus, when the unlocked slider slides down, the side nets of the trawl nets can smoothly move downward along the side-net anchoring bars with the aid of a force that urges the trawl net rearward by a water flow. Thus, anchoring rollers of the side nets of the trawl nets can be prevented from being caught so as to interrupt the slide-down of the slider.

Due to an interaction between the smooth slide-down of the slider along the vertical bars and the smooth slide-down of the net mouth of the side nets along the side-net anchoring bars, the slider can smoothly slide down even when a weight of the slider is reduced. Thus, the lightweight trawl net layer-by-layer collecting device that is not in need for a special driving equipment for forcibly switching the net mouths of the trawl net can be provided.

In the case in which the net-towing wires are connected to substantially the center portion of the frame in a high direction thereof, when the slider starts to slide down, the frame is temporarily inclined forward so that the slide-down of the slider can be more facilitated.

Namely, when the slider starts to slide down, the upper net of the trawl net positioned below the slider is loosened, so that a resistance acting on the trawl net below the slider will concentrate on the lower net of the trawl net. Thus, a rotational torque on a point connected to the net-towing wire is generated, whereby the frame is temporarily inclined forward.

Owing to the forward inclination of the frame, the downward movement of the slider is accelerated, and the slider slides down to a position lower than the center portion of the frame in the high direction.

When the slider comes near the lower part of the frame, the rotational toque is decreased. However, since the trawl net positioned above the slider is expanded, the slider is further pushed downward so that the slider reaches the lowermost position.

Thereafter, the frame returns to the original posture before the operation for switching the trawl nets to be opened and closed, by means of a resistance against the trawl net which is then opened.

According to the present invention in which the net-towing wires are connected to substantially the center portion of the frame in the high direction, when the locked slider is unlocked so that the unlocked slider slides down, the frame is temporarily inclined forward, which can further facilitate the slide-down of the slider. Thus, there can be obtained the lightweight trawl net layer-by-layer collecting device which does not require a special driving equipment for switching the trawl nets to be opened and closed, but can switch the trawl nets to be opened and closed by means of the own weight of the slider.

DETAILED DESCRIPTION OF THE INVENTION

An embodiment of the present invention will be described below with reference to the accompanying drawings.

Figure 1:
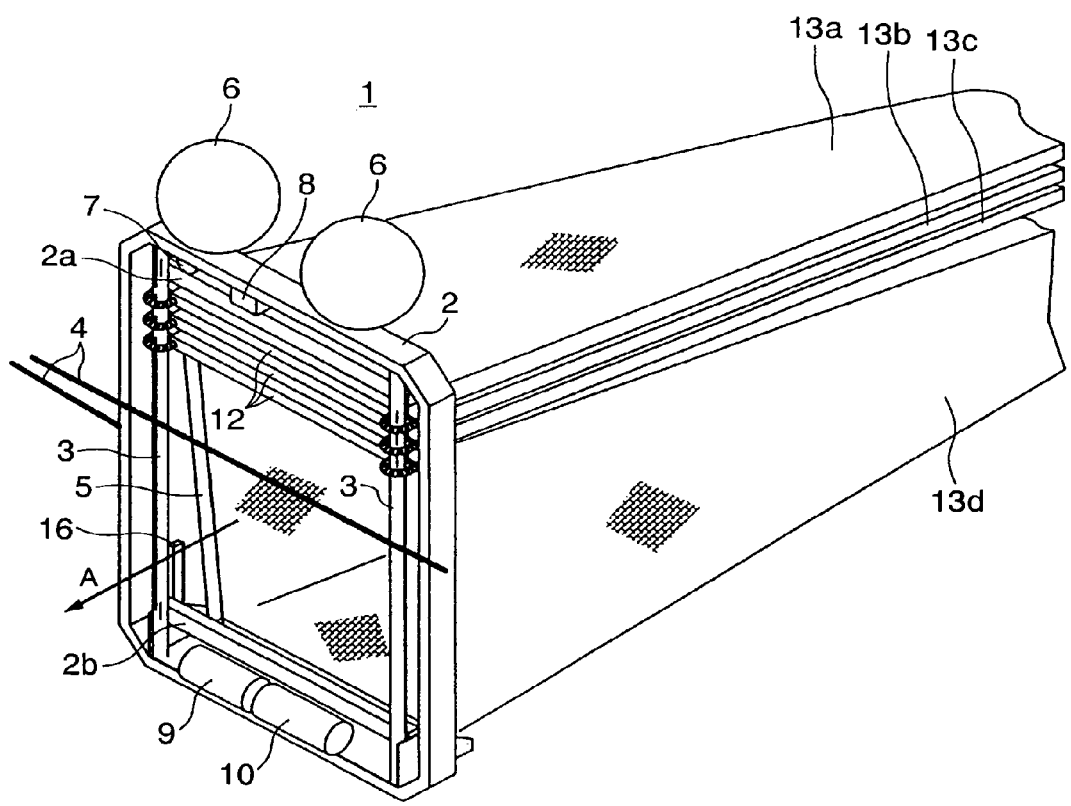
FIG. 1 is a perspective view of a trawl net layer-by-layer collecting device in one embodiment of the present invention.
Figure 2:
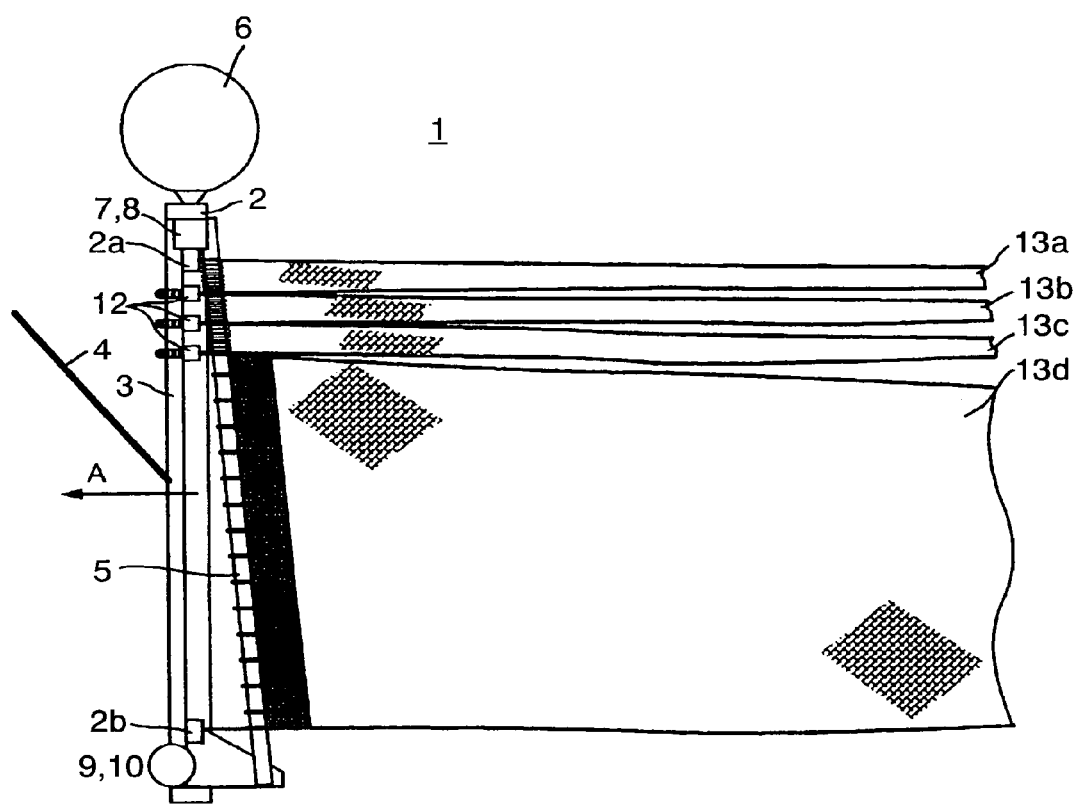
FIG. 2 is a longitudinal sectional view of the trawl net layer-by-layer collecting device in one embodiment of the present invention.
Figure 3:
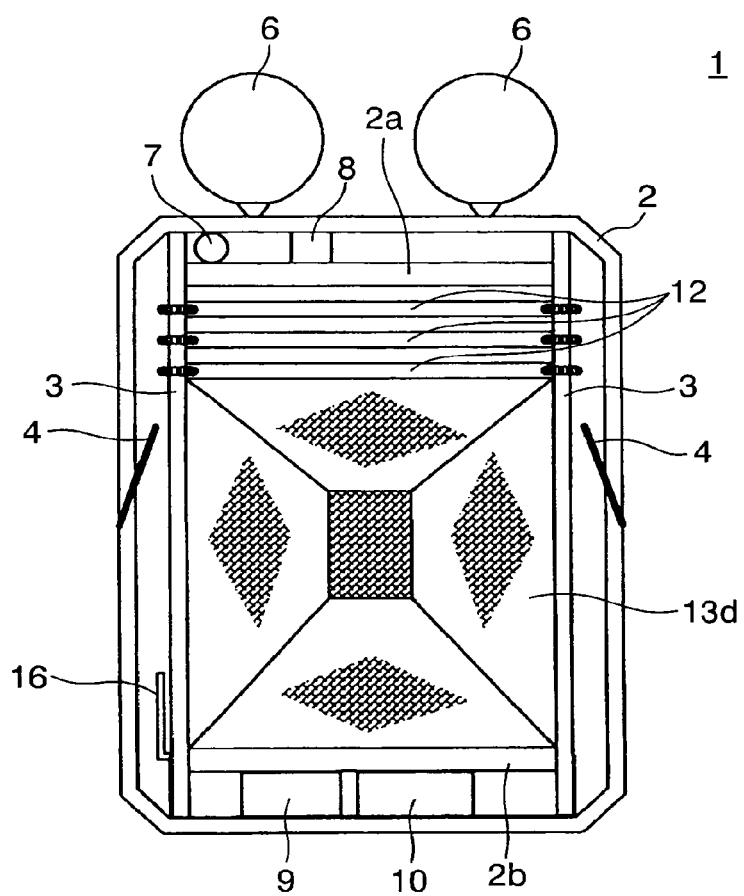
FIG. 3 is a front view of the trawl net layer-by-layer collecting device in one embodiment of the present invention.

FIGS. 1, 2, and 3 show a trawl net layer-by-layer collecting device in one embodiment of the present invention.

FIG. 1 is a perspective view of the trawl net layer-by-layer collecting device 1 in this embodiment. FIG. 2 is a longitudinal sectional view of the trawl net layer-by-layer collecting device 1 in this embodiment. FIG. 3 is a front view of the trawl net layer-by-layer collecting device 1 in this embodiment.

As shown in FIGS. 1, 2, and 3, the trawl net layer-by-layer collecting device 1 includes a substantially rectangular cylindrical 2. Inside the cylindrical frame 2, a pair of vertical bars 3 are disposed on opposed sides of the frame 2.

In this embodiment, the vertical bars 3 are disposed separately from the frame 2 on the opposed sides of the frame 2. However, the present invention includes a structure in which a part of a vertical edge of the frame 2 serves also as the vertical bar. In this case, a member functioning as the frame and a member functioning as the vertical bar are respectively referred to as a frame and a vertical bar in this specification.

Ends of net-towing wires 4 are connected to the center portion of the frame 2 in a high direction thereof.

The arrow A in FIGS. 1 and 2 shows a net-towing direction by the net-towing wires 4.

Inside the frame 2, there are further disposed a pair of side-net anchoring bars 5. An upper end of each of the side-net anchoring bars 5 is positioned near the vertical bar 3, and a lower end thereof is inclined away from the vertical bar 3 in a direction reverse to the net-towing direction A (see, FIGS. 1 and 2).

A pair of floats 6 are disposed above the frame 2. In the drawings, the float 6 has a spherical shape and suspends the frame 2 from above. However, a float of any shape can be used, and the size and the number of the float can be suitably adjusted in consideration of a weight of the frame.

A flowmeter 7 and a net-mouth opening and closing unit 8 are disposed on an upper part of the frame 2.

The flowmeter 7 may be suitably omitted. The net-mouth opening and closing unit 8 is described hereafter.

A controller 9 for controlling an operation of the net-mouth opening and closing unit 8 and a battery pack 10 are disposed on a lower part of the frame 2.

A horizontal member 2a is secured to upper ends of the vertical bars 3, and a horizontal member 2b is secured to lower ends of the vertical bars 3.

The horizontal members 2a and 2b are members separated from a body of the frame 2. However, similarly to the body of the frame 2, since the horizontal members 2a and 2b fixedly constitute a skeleton of the trawl net layer-by-layer collecting device 1, the horizontal members 2a and 2b are parts of the frame 2. Namely, the frame 2 includes a member separated from the body, as long as the member functions as the frame. In the claims, the "upper edge of the frame" may include an upper edge of the frame body and the horizontal member 2a, and the "lower edge of the frame" may include a lower edge of the frame body and the horizontal member 2b.

Disposed between the horizontal member 2a and the horizontal member 2b are a plurality of (three in this embodiment) substantially horizontal sliders 12 whose opposed ends are slidably engaged with the vertical bars 3.

The trawl net layer-by-layer collecting device 1 draws a plurality of (four in this embodiment) trawl nets 13a, 13b, 13c, and 13d.

A net-mouth edge of an upper net of the uppermost trawl net 13a is anchored to the horizontal member 2a (the upper edge of the frame 2), and a net-mouth edge of a lower net of the lowermost trawl net 13d is anchored to the horizontal member 2b (the lower edge of the frame 2).

Anchored to each of the sliders 12 are a net-mouth edge of a lower net of the trawl net which is above the certain slider, and a net-mouth edge of an upper net of the trawl net which is below the certain slider.

As shown in FIG. 2, side nets of all the trawl nets 13a, 13b, 13c, and 13d are anchored to the side-net anchoring bars 5.

At first, all the sliders 12 are locked on the upper ends of the vertical bars 3 by the net-mouth opening and closing unit 8. The locked sliders 12 are unlocked one by one, so that the unlocked slider 12 slides down by its own weight along the vertical bars 3.

The net-mouth opening and closing unit 8 is a means that locks all the sliders 12 on the upper ends of the vertical bars 3 at first, and then unlocks the locked sliders 12 one by one, by a given engagement mechanism.

The engagement mechanism may be a mechanism disclosed in JP3-15016U. However, not limited thereto, the engagement mechanism may be suitably invented by those skilled in the art.

As described above, since the trawl nets 13a, 13b, 13c, and 13d are anchored to the horizontal members 2a and 2b, the sliders 12, and the side-net anchoring bars 5, the opening and closing of the net mouths can be switched by a slide-down of the sliders 12.

In the state shown in FIGS. 1 to 3, for example, the lowermost trawl net 13d is opened. When the lowermost slider 12 slides down, the net mouth of the trawl net 13d is closed, and the net mouth of the trawl net 13c anchored by the lowermost slider 12 and the second lowermost slider 12 is opened. Similarly, by the slide-down of each slider 12, the opened trawl net is closed and the closed trawl net is opened, sequentially.

The conventional LOCHNESS-type trawl net layer-by-layer collecting device includes plural pairs of vertical bars. Thus, a length of the frame is elongated, the number of components are increased, and the size of the device is enlarged, which results in a heavy weight of the device. On the other hand, the device of the present invention includes only one pair of vertical bars 3. The opening and closing of the net mouths of the respective trawl nets is switched by sliding down the sliders 12 one by one along the vertical bars 3. Thus, a thickness of the frame 2 can be reduced, and the number of components can be decreased. Accordingly, a lightweight trawl net layer-by-layer collecting device can be provided, which can be used by even a small-sized research ship having a general trawl winch.

In the present invention, the opposed ends of the slider 12 which are in contact with the vertical bars 3 are made of a low frictional resin. In this case, the slider 12 can more smoothly slide down.

Figure 4:
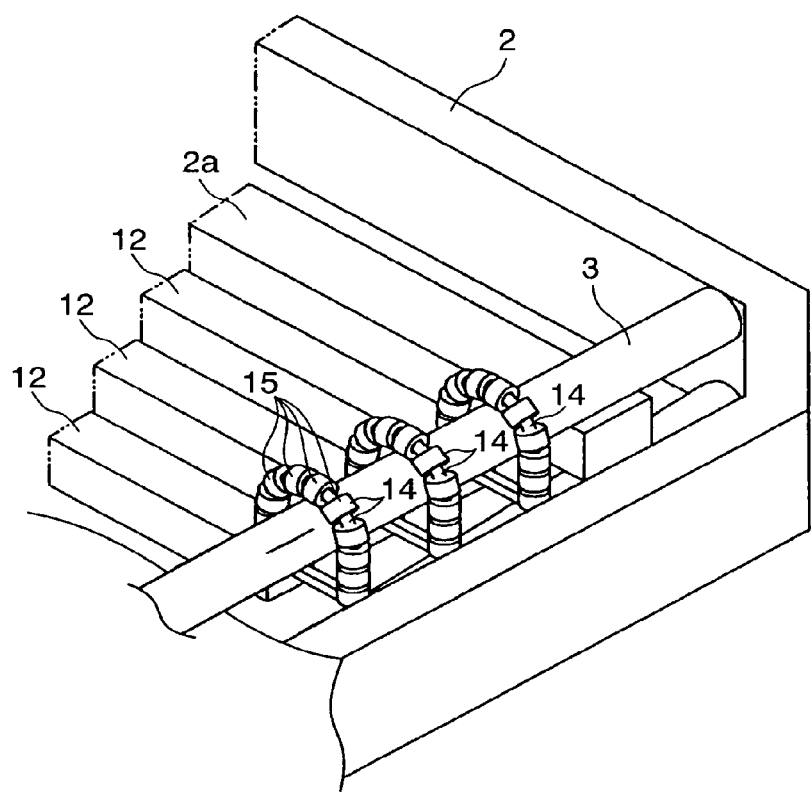
FIG. 4 is perspective view showing an engagement structure between a slider end and a vertical bar in one embodiment of the present invention.

FIG. 4 shows an engagement structure between the end of the slider 12 and the vertical bar 3 in this embodiment.

As shown in FIG. 4, each of the ends of the slider 12 in this embodiment has a U-shaped rebar 14 through which the vertical bar 3 passes.

A part of the rebar 14 which tightly comes into contact with the vertical bar 3, i.e., a part of the rebar 14 on the side of the net-towing direction A, is provided with a rotatable roller 15 made of a low frictional resin.

Due to this engagement structure, when the slider 12 slides down, the roller 15 rotates. Thus, the slider 12 can smoothly slide down because of a low resistance.

A plurality of rollers 15 may be disposed on all the circumference of the rebar 14 surrounding the vertical bar 3.

The shape of the rebar 14 is not limited to a U-shape, and may be a circular shape or the like.

In the example shown in FIG. 4, the roller is used. However, a part to be in contact with the vertical bar 3 may be provided with a sliding plate made of a low frictional resin, so that the slider 12 slides with a low friction.

In the present invention, "a part of each of the engagement rings in contact with the vertical bar is made of a low frictional resin" can include both the roller and the sliding plate being made of a low frictional resin.

In the present invention, as described in this embodiment, the side-net anchoring bars 5 may be inclined. In this case, to switch the opening and closing of the net mouth of the trawl net can be more smoothly performed.

In the conventional trawl net layer-by-layer collecting device, the side nets of the trawl nets are anchored to the vertical bars or bars in parallel with the vertical bars through anchoring wires.

In this case, when the slider slides down along the vertical bars, there is a possibility that the anchoring wires of the side nets of the trawl nets might be caught by the bar, so that the slider cannot easily slide down. Thus, some of the conventional trawl net layer-by-layer collecting device has a special driving equipment that forcibly slides down the slider.

On the other hand, in the present invention, the side-net anchoring bars 5 to which the side nets of the trawl nets are anchored are disposed in an inclined manner.

Thus, when the locked slider 12 is unlocked, anchoring rollers of the side nets move downward along the side-net anchoring bars 5 with the aid of a force that urges the trawl net rearward by a water flow.

Thus, since the anchoring rollers of the side nets do not interrupt the slide-down of the slider 12, the slider 12 can smoothly slide down.

In the present invention, as described in this embodiment, the net-towing wires 4 may be connected to the center portion of the frame 2 in the high direction thereof.

In this case, the opening and closing of the net mouths of the trawl nets can be more smoothly switched, with the aid of a rotational torque generated upon the opening and closing switch operation of the net mouths of the trawl nets.

FIG. 5 is an explanation view for explaining an operation when the net-towing wire 4 is connected to the center portion of the frame 2 in a high direction thereof.

In a case in which the net-towing wire 4 is connected to the center portion of the frame in a high direction thereof, when the net mouths of the trawl nets are switched to be opened and closed, the frame 2 is temporarily inclined forward.

Figure 5A:
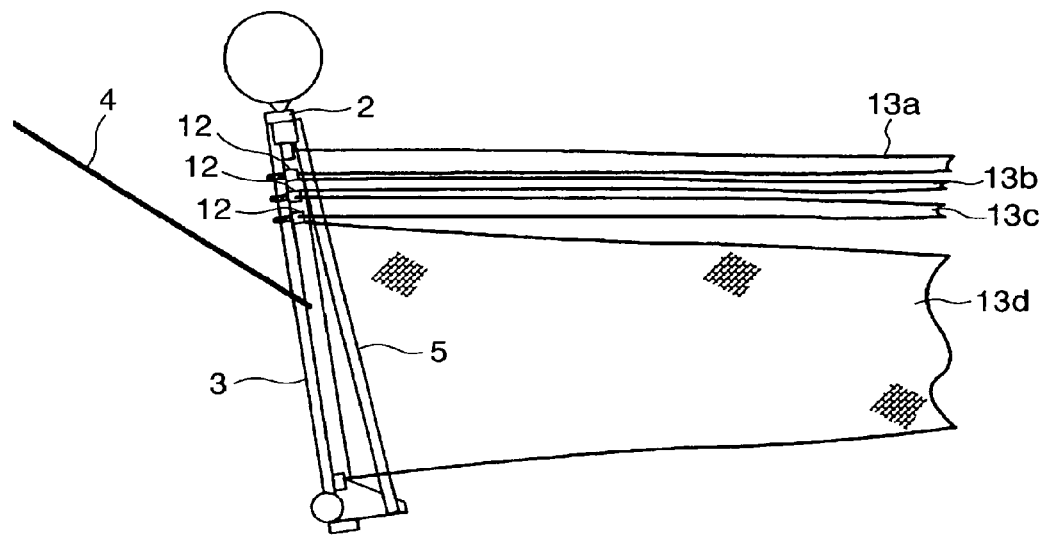
FIG. 5 is an explanation view for explaining an operation when a net-towing wire is connected to a center portion of a frame in a high direction thereof.

FIG. 5(a) shows a state in which all the sliders 12 are locked on the upper ends of the vertical bars 3, so that the trawl net 13d is collecting animals. The net-towing wire 4 is connected to the center portion of the frame 2 in the high direction, and the frame 2 is slightly inclined forward by a balance of a connecting point between the net drawn by the net-towing wire 4 and the net-towing wire 4.

Figure 5B:
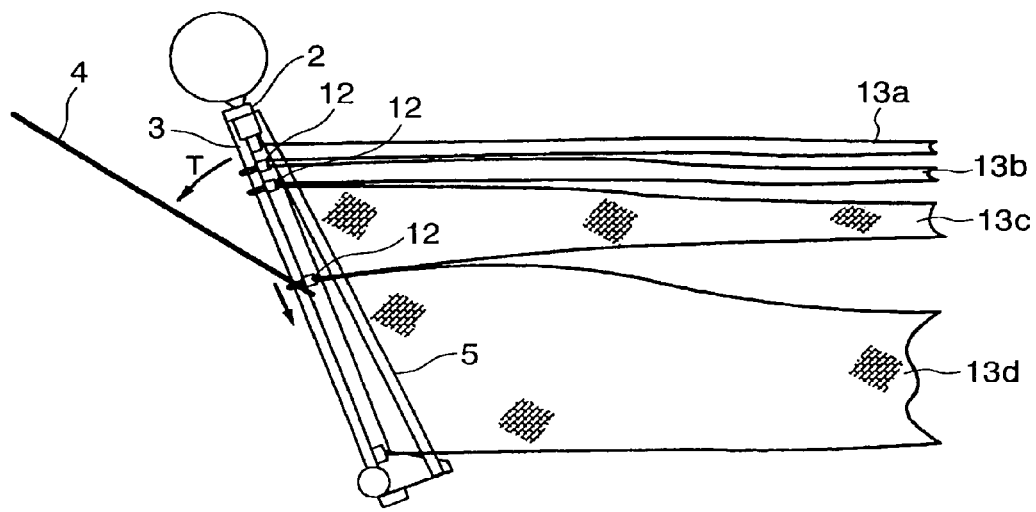

In order that the net mouths of the trawl nets are switched to be opened and closed, the lowermost locked slider 12 is unlocked. Then, as shown in FIG. 5(b), due to the slide-down of the slider 12, the net mouth of the trawl net 13d is narrowed, while the net mouth of the trawl net 13c is opened.

At this time, since the upper net of the trawl net 13d positioned below the sliding slider 12 is loosened, a resistance acting on the trawl net 13d will concentrate on the lower net of the trawl net 13d, so that there is generated a rotational torque T on the connecting point of the net-towing wire.

Thus, the frame 2 is further inclined forward temporarily, as compared with the general net-towing state.

Thus, the vertical bars 3 are further inclined forward, so that the slider 12 smoothly moves downward along the vertical bars 3 by a force that urges the trawl net rearward. At the same time, the anchoring wires of the side nets of the trawl net 13d move smoothly downward along the more inclined side-net anchoring bars 5.

When the slider 12 slides down passing through the connecting point of the net-towing wire 4, the rotational torque T is decreased by a relationship between the connecting point and the point of support of the net-towing wire 4. Thus, the forward inclination angle of the frame 2 will be returned to the original inclination angle.

However, since the trawl net 13c, which is continuously expanded by the water flow, urges the trawl net 13d to move further downward. Thus, the lowermost slider 12 can smoothly slide down up to the lower ends of the vertical bars 3.

As described above, in the case in which the net-towing wires 4 are connected to the center portion of the frame 2 in a high direction thereof, the frame 2 is temporarily inclined forward when the net mouths of the trawl nets are switched to be opened and closed. Thus, the slide-down of the slider 12 can be more facilitated.

The aforementioned trawl net layer-by-layer collecting device can be applied not only to a trawl net layer-by-layer collecting device that autonomously switches the opening and closing of the net mouths of the trawl nets, which is described below, but also to a trawl net layer-by-layer collecting device that is remotely operated.

The controller 9 controls an activation of the net-mouth opening and closing unit 8. Specifically, the controller 9 sends a control signal to the net-mouth opening and closing unit 8 so that one of the locked sliders 12 is unlocked by the net-mouth opening and closing unit 8.

The controller 9 includes therein a timer and a detachable storage medium (not shown).

In this embodiment of the present invention, the storage medium stores a predetermined net-towing time period as a timing for activating the net-mouth opening and closing unit 8.

The controller 9 inputs a net-towing time period starting from a time at which the trawl net layer-by-layer collecting device 1 is put into practice, the net-towing time period being measured by the timer. Referring to the storage medium, the controller 9 sends a control signal to the net-mouth opening and closing unit 8 so as to activate the net-mouth opening and closing unit 8, upon arrival of the predetermined net-towing time period stored in the storage medium.

Based on the control signal from the controller 9, the net-mouth opening and closing unit 8 unlocks one of the locked sliders 12, so that the unlocked slider 12 slides down by its own weight along the vertical bars 3. Thus, the net mouths of the trawl nets can be switched to be opened and closed.

According to the present invention, the timing for activating the net-mouth opening and closing unit 8 is controlled by a bathometer, the timer inside the controller 9, and the activation timing stored in the storage medium. Thus, the net mouths of the trawl nets can be autonomously switched to be opened and closed. As a result, there can be omitted a special equipment required for a remote operation from the ship.

In another embodiment of the present invention, there can be provided a bathometer inside the controller 9, a closure sensor 16 configured to detect the fact that the slider 12 slides down or up to a predetermined position, and a recording unit (not shown) configured to record data in the storage medium.

The closure sensor 16 is disposed on the lower end of the vertical bar such that the closure sensor 16 can confirm whether the slider 12 slides down or up to the lower ends of the vertical bars 3. The closure sensor 16 may be a contact-type mechanical sensor, a noncontact optical sensor, an ultrasonic sensor, and so on.

In this embodiment, the controller 9 obtains, with reference to the timer, a water depth at which the net-mouth opening and closing unit 8 is activated, a time thereat, and a time at which the closure sensor 16 detects the fact that the slider 12 slides down or up to the predetermined position.

The controller 9 causes the recording unit to record in the storage medium the thus obtained water depth at which the net-mouth opening and closing 8 is activated, the time thereat, and the time at which the detection signal of the closure sensor 16 is inputted.

Figure 6:
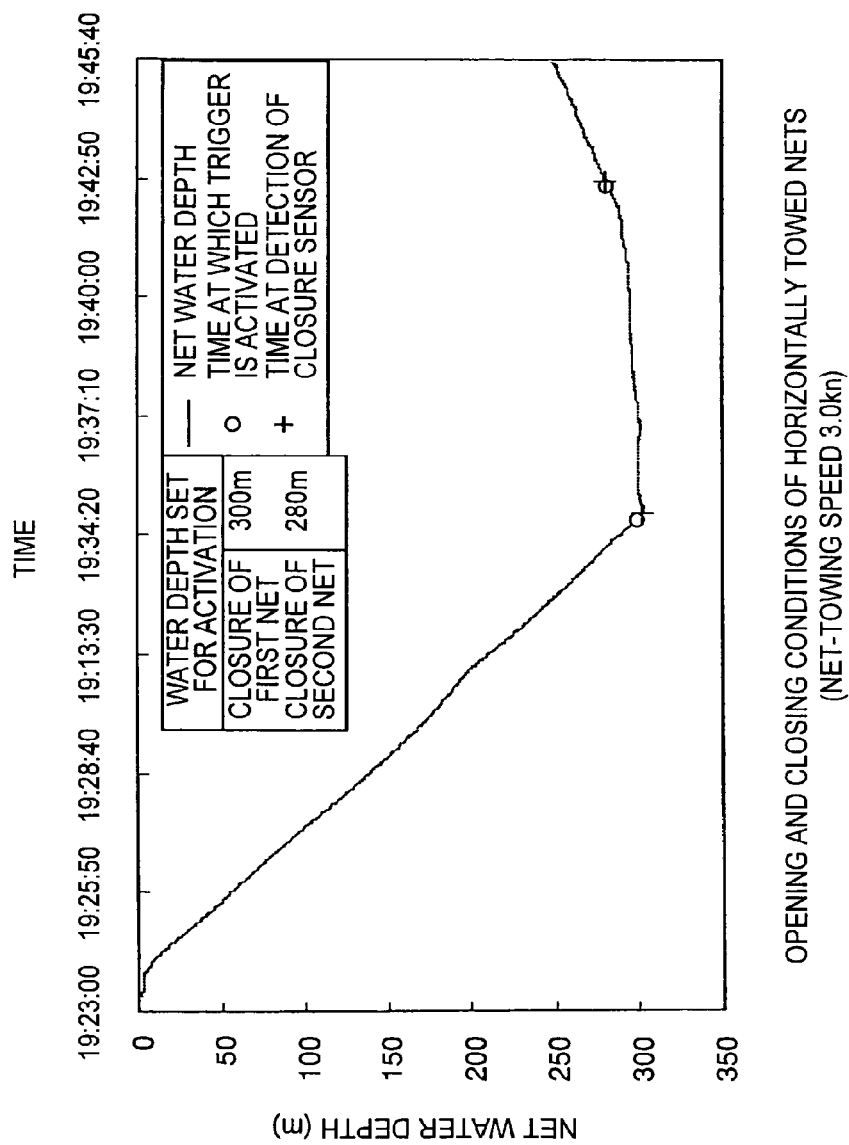
FIG. 6 is a graph showing a water depth at which a net-mouth opening and closing unit is activated, a time thereat, and a time at which a closure sensor detects the fact that the slider slides down up to the predetermined position.

FIG. 6 is a graph showing a water depth at which the net-mouth opening and closing unit 8 is activated, a time thereat, a time at which the closure sensor 16 detects the fact that the slider 12 slides down or up to a predetermined position, and a water depth, which are recorded in the storage medium by the recording unit.

As shown in FIG. 6, according to this embodiment, after the trawl net layer-by-layer collecting device 1 has been drawn up, the time at which the net-mouth opening and closing unit 8 was activated, the time at which the closure sensor 16 detected the fact that the slider 12 slid down to the predetermined position, and the water depth, can be confirmed by reading the data recorded in the storage medium. Thus, there can be confirmed whether the net mouths of the trawl nets have been switched to be opened and closed in an intended manner. Accordingly, an accurate resource research can be conducted.

According to another embodiment of the present invention, the storage medium can store a combination of a predetermined net-towing time period and a predetermined water depth, as a timing for activating the net-mouth opening and closing unit 8.

When the net-mouth opening and closing unit 8 is activated based only on an elapse of a predetermined net-towing time period which is measured by the timer, there is a possibility that the trawl net layer-by-layer collecting device might not reach an intended water depth.

When animals are collected according to water depth, it is reasonable in terms of dynamics that the trawl net layer-by-layer collecting device is firstly moved downward in the sea to be settled on the deepest position, and then the trawl net layer-by-layer collecting device is moved upward in the sea while collecting animals according to water depth. However, when the net-mouth opening and closing unit 8 is activated based only on a water depth, there is a possibility that the net-mouth opening and closing unit 8 might be activated in the course of the downward movement of the trawl net layer-by-layer collecting device in the sea.

For this reason, the controller 9 includes therein the bathometer, and the storage medium stores a combination of a predetermined net-towing time period and a predetermined water depth as a timing for activating the net-mouth opening and closing unit 8. Thus, the controller 9 inputs the net-towing time period obtained from the timer, and inputs the water depth obtained from the bathometer inside the controller 9. When the net-towing time period and the current water depth satisfy the activation timing stored in the storage medium, the controller 9 activates the net-mouth opening and closing unit 8. Thus, in the course of the upward movement of the trawl net layer-by-layer collecting device in the sea, the net mouths of the trawl nets can be switched to be opened and closed at an intended water depth.

Therefore, in the completely autonomous operation for switching the opening and closing of the net mouths of the trawl nets, the net-mouth opening and closing unit can be activated at an intended timing and at an intended water depths.

According to another embodiment of the present invention, the storage medium can store, as a timing for activating the net-mouth opening and closing unit 8, a predetermined water depth in an increase inclination or a decrease inclination of water depth.

In this embodiment, the controller 9 inputs water depths obtained from the bathometer inside the controller 9, and judges whether the water depth is increased or decreased based on a difference between the water depths of different timings. When the increase inclination or the decrease inclination of water depth and the current water depth satisfy the increase inclination or the decrease inclination of water depth and the predetermined water depth which are stored in the storage medium, the controller 9 activates the net-mouth opening and closing unit 8 so as to switch the opening and closing of the net mouths of the trawl nets.

According to this embodiment, in the course of the upward movement of trawl net layer-by-layer collecting device in the sea, the net mouths of the trawl nets can be switched to be opened and closed at an intended water depth.

Figure 7:
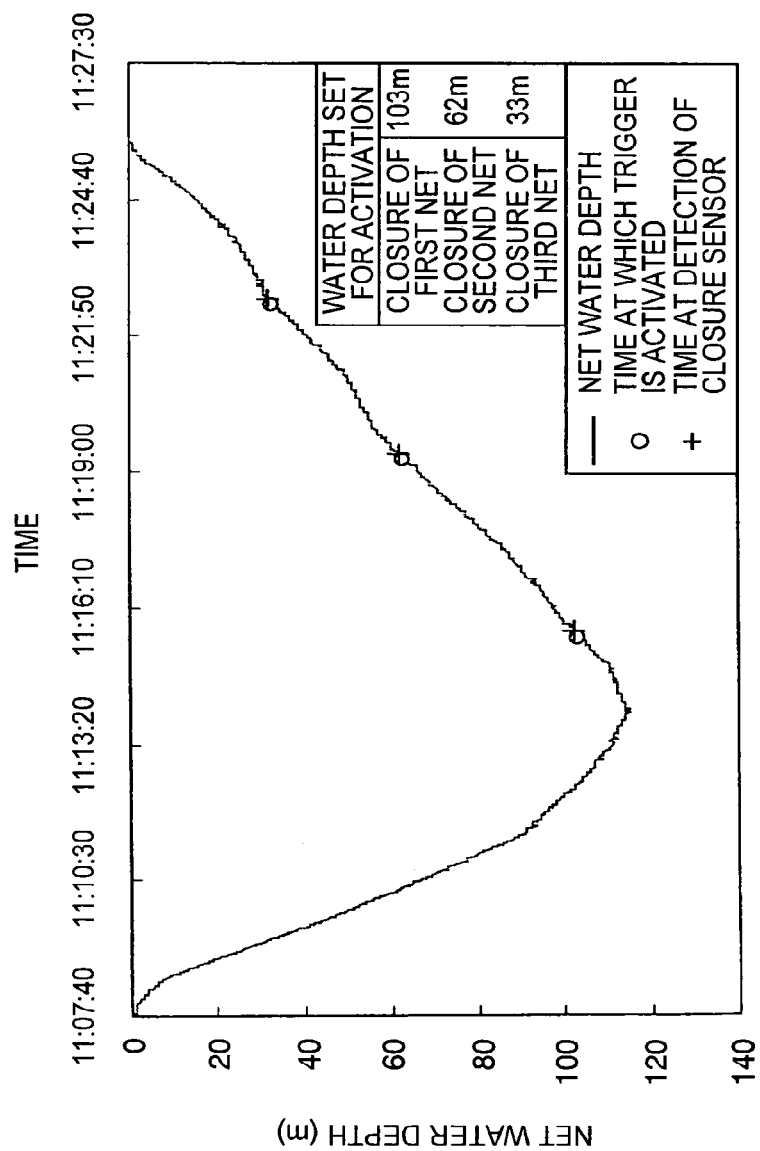
FIG. 7 is a graph showing a water depth at which the net-mouth opening and closing unit is activated in the course of an upward movement of the trawl net layer-by-layer collecting device in the sea, a time thereat, and a time at which the closure sensor detects the fact that the slider slides down up to the predetermined position.
Figure 8:
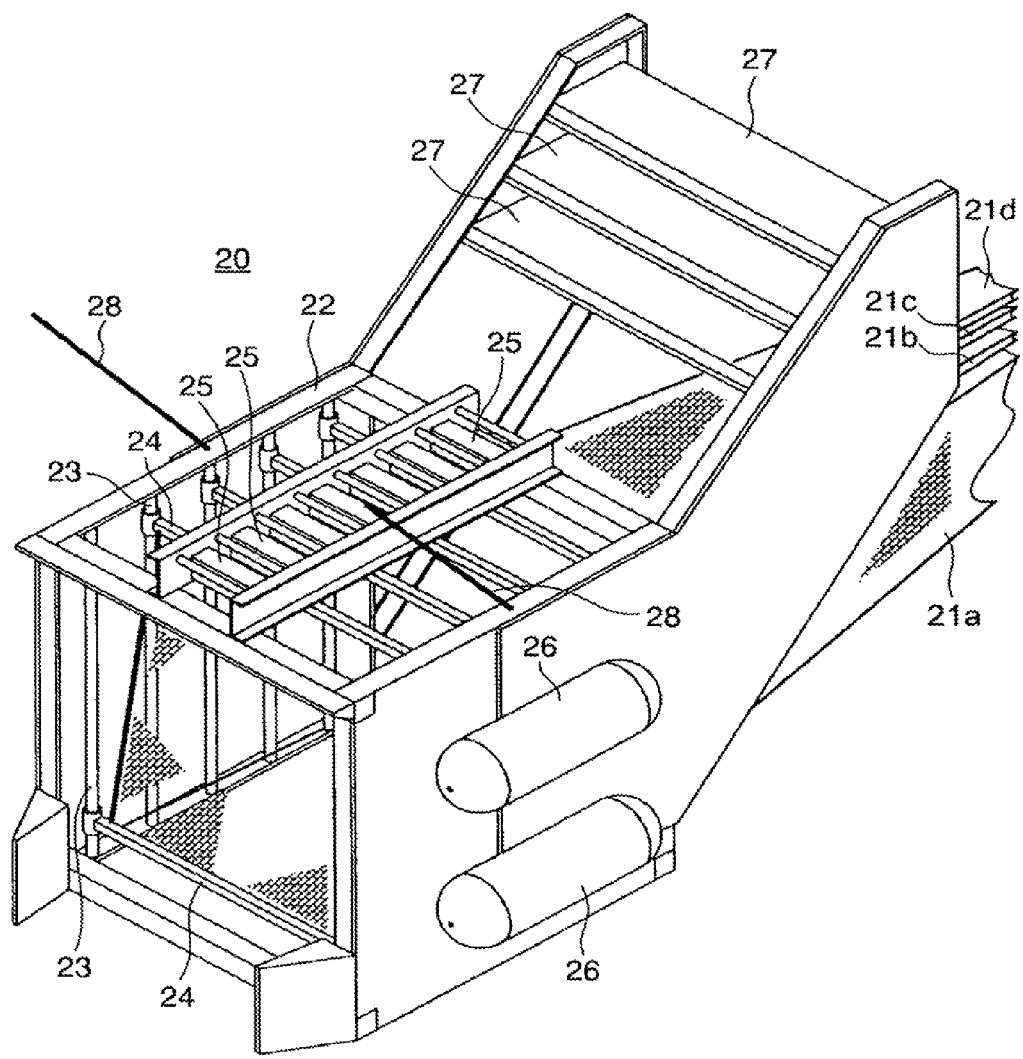
FIG. 8 is a perspective view generally showing a LOCH-NESS that is a conventional trawl net layer-by-layer collecting device.
Figure 9:
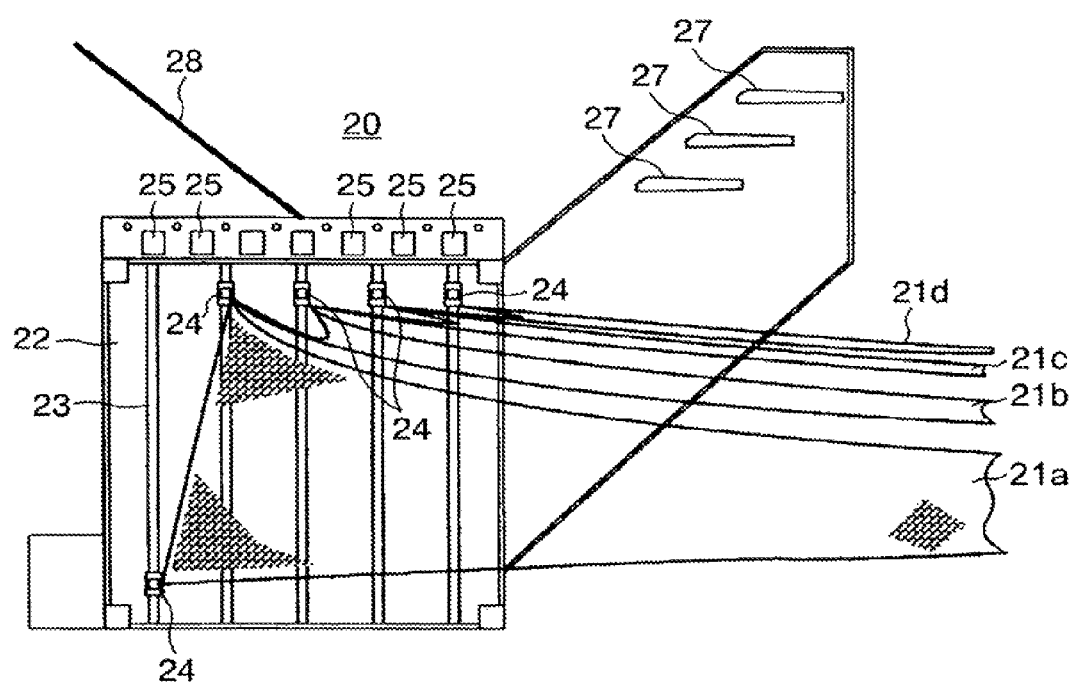
FIG. 9 is a longitudinal sectional view showing the LOCH-NESS that is a conventional trawl net layer-by-layer collecting device.

FIG. 7 is a graph showing a time at which the net-mouth opening and closing unit 8 is activated at an intended water depth in the course of the upward movement of the trawl net layer-by-layer collecting device, and a time at which the closure sensor 16 detects the fact that the slider 12 slides down up to the predetermined position, which are recorded by the recording unit.

The invention claimed is:

1. A trawl net layer-by-layer collecting device comprising:
a substantially rectangular frame configured to draw a plurality of trawl nets that are arranged in an up and down direction, the frame including an upper edge to which a net mouth edge of an upper net of an uppermost trawl net is anchored, and a lower edge to which a net mouth edge of a lower net of a lowermost trawl net is anchored;
a pair of vertical bars disposed on opposed sides of the frame;
at least one substantially horizontal slider having opposed ends slidably engaged with the vertical bars, the at least one substantially horizontal slider having anchored thereto at least one of a net mouth edge of a lower net of an upper trawl net and a net mouth edge of a lower net of the uppermost trawl net, and at least one of a net mouth edge of an upper net of a lower trawl net and an a net mouth edge of an upper net of the lowermost trawl net;
a net-mouth opening and closing unit configured to lock the at least one substantially horizontal slider on upper ends of the vertical bars, and unlock the at least one substantially horizontal slider when locked so that the unlocked at least one substantially horizontal slider slides down along the vertical bars so as to switch opening and closing of net mouths of the trawl nets; and
a controller configured to control an activation of the net-mouth opening and closing unit;
wherein:
the controller includes a timer, and a storage medium storing a predetermined net-towing time period as a timing for activating the net-mouth opening and closing unit; and
the controller is configured to input a net-towing time obtained from the timer, and activate the net-mouth opening and closing unit upon arrival of the predetermined net-towing time period stored in the storage medium, so as to switch the opening and closing of the net mouths of the trawl nets.

2. The trawl net layer-by-layer collecting device according to claim 1, the device comprising a bathometer,
wherein:
the storage medium is configured to store a predetermined water depth in an increase inclination or a decrease inclination of water depth, as a timing for activating the net-mouth opening and closing unit; and
the controller is configured to input water depths obtained from the bathometer, judge whether the water depth is increased or decreased based on a difference between the water depths of different timings, and activate the net-mouth opening and closing unit when the increase inclination or the decrease inclination of water depth and the current water depth satisfy the increase inclination or the decrease inclination of water depth and the predetermined water depth which are stored in the storage medium, so as to switch the opening and closing of the net mouths of the trawl nets.

3. The trawl net layer-by-layer collecting device according to claim 2, the device comprising:
a closure sensor configured to detect when the at least one substantially horizontal slider slides down or up to a predetermined position; and
a recording unit configured to record data in the storage medium;
wherein the controller is configured to input a time at which the controller activates the net-mouth opening and closing unit, a water depth thereat, a time at which the closure sensor detects the fact that the at least one substantially horizontal slider slides down or up to the predetermined position, and a water depth thereat, which are obtained from the timer and the bathometer, and cause the recording unit to record in the storage medium the time at which the net-mouth opening and closing unit is activated, the water depth thereat, the time at which the at least one substantially horizontal slider slides down or up to the predetermined position, and the water depth thereat.

4. The trawl net layer-by-layer collecting device according to claim 3, wherein
the at least one substantially horizontal slider is disposed at opposed ends thereof with engagement rings that are slidably engaged with the vertical bars, and
at least a part of each of the engagement rings in contact with the vertical bar is made of a low frictional resin.

5. The trawl net layer-by-layer collecting device according to claim 2, wherein
the at least one substantially horizontal slider is disposed at opposed ends thereof with engagement rings that are slidably engaged with the vertical bars, and
at least a part of each of the engagement rings in contact with the vertical bar is made of a low frictional resin.

6. The trawl net layer-by-layer collecting device according to claim 1, the device comprising a bathometer,
wherein:
the storage medium is configured to store a combination of a predetermined net-towing time period and a predetermined water depth, as a timing for activating the net-mouth opening and closing unit; and
the controller is configured to input a net-towing time period obtained from the timer and a water depth obtained from the bathometer, and activate the net-mouth opening and closing unit when the net-towing time period and the current water depth satisfy the combination of the predetermined net-towing time period and the predetermined water depth which are stored in the storage medium, so as to switch the opening and closing of the net mouths of the trawl nets.

7. The trawl net layer-by-layer collecting device according to claim 6, the device comprising:
a closure sensor configured to detect when the at least one substantially horizontal slider slides down or up to a predetermined position; and
a recording unit configured to record data in the storage medium;
wherein the controller is configured to input a time at which the controller activates the net-mouth opening and closing unit, a water depth thereat, a time at which the closure sensor detects the fact that the at least one substantially horizontal slider slides down up to the predetermined position, and a water depth thereat, which are obtained from the timer and the bathometer, and cause the recording unit to record in the storage medium the time at which the net-mouth opening and closing unit is activated, the water depth thereat, the time at which the at least one substantially horizontal slider slides down or up to the predetermined position, and the water depth thereat.

8. The trawl net layer-by-layer collecting device according to claim 7, wherein the at least one substantially horizontal slider is disposed at opposed ends thereof with engagement rings that are slidably engaged with the vertical bars, and at least a part of each of the engagement rings in contact with the vertical bar is made of a low frictional resin.

9. The trawl net layer-by-layer collecting device according to claim 6, wherein the at least one substantially horizontal slider is disposed at opposed ends thereof with engagement rings that are slidably engaged with the vertical bars, and at least a part of each of the engagement rings in contact with the vertical bar is made of a low frictional resin.

10. The trawl net layer-by-layer collecting device according to claim 1, wherein the at least one substantially horizontal slider is disposed at opposed ends thereof with engagement rings that are slidably engaged with the vertical bars, and at least a part of each of the engagement rings in contact with the vertical bar is made of a low frictional resin.

\* \* \* \* \*